(12) United States Patent  
Tamura

(10) Patent No.: US 7,317,545 B2
(45) Date of Patent: Jan. 8, 2008

(54) IMAGE FORMING APPARATUS FOR CHANGING AN IMAGE FORMATION LEVEL

(75) Inventor: Noboru Tamura, Kanagawa (JP)

(73) Assignee: Ricoh Company Ltd., Tokyo (JP)

( * ) Notice: Subject to any disclaimer, the term of this patent is extended or adjusted under 35 U.S.C. 154(b) by 993 days.

(21) Appl. No.: 10/444,376

(22) Filed: May 22, 2003

(65) Prior Publication Data

US 2003/0218763 A1   Nov. 27, 2003

(30) Foreign Application Priority Data

May 27, 2002   (JP)   ............... 2002-152638

(51) Int. Cl.
*G06F 3/12*   (2006.01)
(52) U.S. Cl. ............... 358/1.13; 358/1.14; 358/1.15; 358/1.1
(58) Field of Classification Search ............... 358/1.13, 358/1.14, 1.15, 1.1
See application file for complete search history.

(56) References Cited

U.S. PATENT DOCUMENTS

| | | | | |
|---|---|---|---|---|
| 4,917,366 A | * | 4/1990 | Murakami et al. | 270/58.09 |
| 5,535,012 A | * | 7/1996 | Matsumoto et al. | 358/400 |
| 5,587,730 A | | 12/1996 | Karz | |
| 5,625,860 A | * | 4/1997 | Maeda et al. | 399/403 |
| 5,852,765 A | * | 12/1998 | Yamashita et al. | 399/407 |
| 6,125,242 A | * | 9/2000 | Yamada | 399/23 |
| 6,161,476 A | * | 12/2000 | Yoneoka | 101/118 |
| 6,357,737 B1 | * | 3/2002 | Yoshida | 270/58.08 |
| 6,361,036 B1 | * | 3/2002 | Nakazawa | 270/58.07 |
| 6,374,077 B1 | * | 4/2002 | Hirai et al. | 399/407 |
| 6,496,278 B1 | | 12/2002 | Tamura et al. | |
| 6,614,546 B1 | * | 9/2003 | Kurozasa | 358/1.15 |
| 7,017,903 B2 | * | 3/2006 | Fujii et al. | 271/298 |

FOREIGN PATENT DOCUMENTS

| | | |
|---|---|---|
| EP | 0914954 A1 | 5/1999 |
| JP | 2001341383 | 12/2001 |

* cited by examiner

*Primary Examiner*—Twyler Lamb
*Assistant Examiner*—Jacky X. Zheng
(74) *Attorney, Agent, or Firm*—Cooper & Dunham LLP

(57) ABSTRACT

An image forming apparatus can continue an execution of a job without canceling when an error occurs during an image forming operation.

20 Claims, 8 Drawing Sheets

FIG.5

| | SETTING VALUE |
|---|---|
| PANEL SETUP | CHANGE PROHIBITED |

FIG.6

| USER NAME | SETTING VALUE |
|---|---|
| USER A | CHANGE PERMITTED |
| USER B | CHANGE PERMITTED |
| USER C | CHANGE PROHIBITED |

FIG.7

| | SETTING VALUE |
|---|---|
| NUMBER OF PRINTS | 50 |

FIG.9

NO PRINT PAPER MATCHING THE DESIGNATED SIZE AND KIND.
STAPLING PROCESS IS SET AND PAPER SUPPLY TRAY
CANNOT BE DESIGNATED.
STAPLING PROCESS IS CANCELLED BY PRESSING "CANCEL".

| JOB RESET | CANCEL |

IMAGE FORMING APPARATUS FOR CHANGING AN IMAGE FORMATION LEVEL

BACKGROUND OF THE INVENTION

1. Field of the Invention

The present invention generally relates to image forming apparatuses and, more particularly, to an image forming apparatus, such as a printer, a copy machine, a facsimile apparatus or a digital compound machine, which is capable forming an image at a plurality of image formation levels.

2. Description of the Related Art

In image forming apparatuses, such as a printer, a copy machine, a facsimile apparatus or a digital compound machine, when an error occurs during an image forming operation, conventionally, the image forming operation is interrupted, and the image forming apparatus is set in a standby state until the cause of the error is eliminated. Therefore, if an error occurs, the image forming operation cannot be resumed until a user eliminates the cause of the error. For this reason, as a result, a completion of the image formation is delayed very much. In order to avoid such as problem, the user must supervise the state of the image forming apparatus, which causes a problem that working efficiency is bad.

Especially, when a plurality of users (or host apparatuses) share an image forming apparatus, there is a case in which a job requested by one of the users cannot be performed due to an error which has occurred during an execution of a job which the one of the user does not know, which problem is serious.

Japanese Laid-Open Patent Application No. 2001-341383 discloses a printer, which solves the above-mentioned problem. This printer cancels a job, if an error occurs during execution of the job and the error can be eliminated by canceling the job, and automatically releases the error state which is eliminated by the cancellation of the job. When the error state is released to an extent that an image formation is performed, an interrupted image forming operation is resumed. According to such a printer, even when an error occurs during execution of a certain job and the error does not cause a trouble in execution of future jobs, a next job can be performed automatically. Therefore, working efficiency can be improved.

Therefore, in the above-mentioned printer, when resuming an image forming operation automatically after occurrence of an error, the job which caused the occurrence of the error is forcibly canceled. In such a case, a user has to make an instruction for printing again so as to perform an image forming operation concerning the canceled job. However, when the error is relevant only to functions, which are not directly related to the image forming operation, the image forming operation may be performed without canceling the whole job. Therefore, canceling the job also in such a case may cause a problem of deterioration of working efficiency.

SUMMARY OF THE INVENTION

It is a general object of the present invention to provide an improved and useful image forming apparatus in which the above-mentioned problems are eliminated.

A more specific object of the present invention is to provide an image forming apparatus which can continue an execution of a job without canceling when an error occurs during an image forming operation so as to improve working efficiency for image formation.

In order to achieve the above-mentioned objects, there is provided according to one aspect of the present invention an image forming apparatus which is capable of performing an optional operation in addition to an image forming operation, the image forming apparatus comprising: image forming means for forming an image on a print sheet based on given data according to a plurality of image formation levels including at least a complete output level and a limited output level, all setting items set by a user being reflected at the complete output level and a part of the setting items set by the user being changed or invalidated at the limited output level; error discriminating means for discriminating an error which relates to the optional operation and is avoidable by changing one of the image formation levels which is currently set in the image forming apparatus to a different one of the image formation levels; and level changing means for changing, when an error occurs during an image forming operation performed at the complete output level and the error discriminating means discriminates that the error is avoidable by changing the image formation level, the complete output level to the different one of the image formation levels at which the error is avoidable.

In the image forming apparatus according to the present invention, the image forming levels may include the complete output level, the limited output level and a compulsory output level at which a formation of an image is given a priority and minimum setting items are validated; and the level changing means may include first level changing means and second level changing means, the first level changing means for changing, when an error occurs during an image forming operation performed at the complete output level and the error discriminating means discriminates that the error is avoidable by changing the image formation level, the complete output level currently set in the image forming apparatus to the limited output level, the second level changing means for changing, when an error occurs during an image forming operation performed at the limited output level and the error discriminating means discriminates that the error is avoidable by changing the image formation level, the limited output level currently set in the image forming apparatus to the compulsory output level.

Additionally, the image forming apparatus according to the present invention may further comprise level change permission setting means for setting permission or prohibition of an operation of the level changing means. Further, the image forming apparatus according to the present invention may further comprise a finisher which performs the optional operation including at least one of a stapling operation performed by stapling process means and a punching operation performed by punching process means, wherein use of the stapling process means and/or the punching operation means of the finisher is permitted at the complete output level and use of the stapling process means and/or the punching operation means of the finisher is prohibited at the limited output level.

Additionally, the image forming apparatus according to the present invention may further comprise a display part which displays information to the user, wherein the level changing means may include change permission reception means and change execution means, wherein the change permission reception means causes the display part to display information indicating that the error is avoidable by changing the image formation level so as to receive an instruction of permission of the change to the image formation level at which the error is avoidable, and the change execution means changes to image formation level at which the error is avoidable when the instruction of permission is received by the change permission reception means.

The above-mentioned image forming apparatus may further comprise an operation part through which the user operate the image forming apparatus, wherein the level change permission setting means sets the permission or prohibition in accordance with an instruction supplied through the operation part.

In the image forming apparatus, the level change permission setting means may set the permission or prohibition on an individual image forming job basis. The level change permission setting means may set the permission or prohibition on an individual user basis. The level change permission setting means may set the prohibition when a number of print sheets to be output is equal to or greater than a predetermined number.

In the image forming apparatus according to the present invention, the change permission reception means may cause the display part to display information indicating that the error is avoidable by changing the image formation level to the limited output level according to a result of discrimination by the error discrimination means so as to receive the instruction of permission of the change to the limited output level; the change execution means may change the image formation level to the limited output level when the change permission reception means receives the instruction of permission; and the level changing means may include means for changing the image formation level to the limited output level even when the change permission reception means does not receive any instruction from a start of reception for a predetermined time period.

The image forming apparatus according to the present invention may further comprise a finisher which performs the optional operation including at least one of a stapling operation performed by stapling process means and a punching operation performed by punching process means, wherein use of the stapling process means and/or the punching operation means of the finisher is permitted at the complete output level and use of the stapling process means and/or the punching operation means of the finisher is prohibited at the limited output level.

There is provided according another aspect of the present invention an image forming system comprising an image forming apparatus and a host apparatus connected to the image forming apparatus via a network, wherein the image forming apparatus comprising: image forming means for forming an image on a print sheet based on given data according to a plurality of image formation levels including at least a complete output level and a limited output level, all setting items set by a user being reflected at the complete output level and a part of the setting items set by the user being changed or invalidated at the limited output level; error discriminating means for discriminating an error which relates to the optional operation and is avoidable by changing one of the image formation levels which is currently set in the image forming apparatus to a different one of the image formation levels; level changing means for changing, when an error occurs during an image forming operation performed at the complete output level and the error discriminating means discriminates that the error is avoidable by changing the image formation level, the complete output level to the different one of the image formation levels at which the error is avoidable; and level change permission setting means for setting permission or prohibition of an operation of the level changing means, wherein the image forming means forms an image based on data transmitted from the host apparatus, and the host apparatus includes means for sending to the image forming apparatus information regarding an instruction of setting permission or prohibition to be made by the level change permission setting means.

Additionally, there is provided according to another aspect of the present invention an image forming method performed by an image forming apparatus which is capable of performing an optional operation in addition to an image forming operation, the image forming apparatus forming an image on a print sheet based on given data according to a plurality of image formation levels including at least a complete output level and a limited output level, all setting items set by a user being reflected at the complete output level and a part of the setting items set by the user being changed or invalidated at the limited output level, the image forming method comprising the steps of; discriminating an error which relates to the optional operation and is avoidable by changing one of the image formation levels which is currently set in the image forming apparatus to a different one of the image formation levels; and changing, when an error occurs during an image forming operation performed at the complete output level and the error discriminating step discriminates that the error is avoidable by changing the image formation level, the complete output level to the different one of the image formation levels at which the error is avoidable.

In the image forming method according to the present invention, the image forming levels may include the complete output level, the limited output level and a compulsory output level at which a formation of an image is given a priority and minimum setting items are validated; and the level changing step may include a first level changing step and a second level changing step, the first level changing step for changing, when an error occurs during an image forming operation performed at the complete output level and the error discriminating step discriminates that the error is avoidable by changing the image formation level, the complete output level currently set in the image forming apparatus to the limited output level, the second level changing step for changing, when an error occurs during an image forming operation performed at the limited output level and the error discriminating step discriminates that the error is avoidable by changing the image formation level, the limited output level currently set in the image forming apparatus to the compulsory output level.

The image forming method according to the present invention may further comprise a level change permission setting step of setting permission or prohibition of an operation of the level changing step. Additionally, the image forming apparatus may further comprise a finisher which performs the optional operation including at least one of a stapling operation performed by stapling process means and a punching operation performed by punching process means, wherein use of the stapling process means and/or the punching operation means of the finisher may be permitted at the complete output level and use of the stapling process means and/or the punching operation means of the finisher may be prohibited at the limited output level.

In the image forming method according to the present invention, the level changing step may include a change permission reception step and a change execution step, wherein the change permission reception step causes a display part provided in the image forming apparatus to display information indicating that the error is avoidable by changing the image formation level so as to receive an instruction of permission of the change to the image formation level at which the error is avoidable, and the change execution step changes the current image formation level to a level at which the error is avoidable when the instruction of permission is received in the change permission reception step.

In the image forming method, the level change permission setting step may set the permission or prohibition in accordance with an instruction supplied through an operation part of the image forming apparatus. The level change permission setting step may set the permission or prohibition on an individual image forming job basis. The level change permission setting step may set the permission or prohibition on an individual user basis. The level change permission setting step may set the prohibition when a number of print sheets to be output is equal to or greater than a predetermined number.

Additionally, in the image forming method according to the present invention, the change permission reception step may cause the display part to display information indicating that the error is avoidable by changing the image formation level to the limited output level according to a result of discrimination by the error discrimination step so as to receive the instruction of permission of the change to the limited output level; the change execution step may change the image formation level to the limited output level upon receipt of the instruction of permission in the change permission reception step; and the level changing step may include a step of changing the image formation level to the limited output level even when no instruction is received in the change permission reception step from a start of reception for a predetermined time period.

According to the image forming apparatus and method and the image forming system according to the present invention, if an error occurs during an image forming operation and I the error is avoidable by changing the image formation level, the image forming job can be continued without canceling the job. Accordingly, even when an error occurs, cancellation of jobs can be minimized, thereby improving a work efficiency of an image formation.

In one example, the image forming apparatus is capable of performing an optional operation in addition to an image forming operation. An image is formed on a print sheet based on given data according to a plurality of image formation levels including at least a complete output level and a limited output level, all setting items set by a user being reflected at the complete output level and a part of the setting items set by the user being changed or invalidated at the limited output level. Discrimination is made as to whether an error relates to the optional operation and whether the error is avoidable. When an error occurs during an image forming operation performed at the complete output level and the error is discriminates as avoidable by changing the image formation level, the complete output level is changed to the limited output level.

Other objects, features and advantages of the present invention will become more apparent from the following detailed description when read in conjunction with the accompanying drawings.

BRIEF DESCRIPTION OF THE DRAWINGS

FIG. 5 is an example of a setup of permission of an image level changing operation in the printer according to the third embodiment of the present invention;

FIG. 6 is another example of a setup of permission of an image level changing operation in the printer according to the third embodiment of the present invention;

FIG. 7 is a further example of a setup of permission of an image level changing operation in the printer according to the third embodiment of the present invention;

FIG. 9 is an example of a display of a message; and

DETAILED DESCRIPTION OF THE PREFERRED EMBODIMENTS

Figure 1:
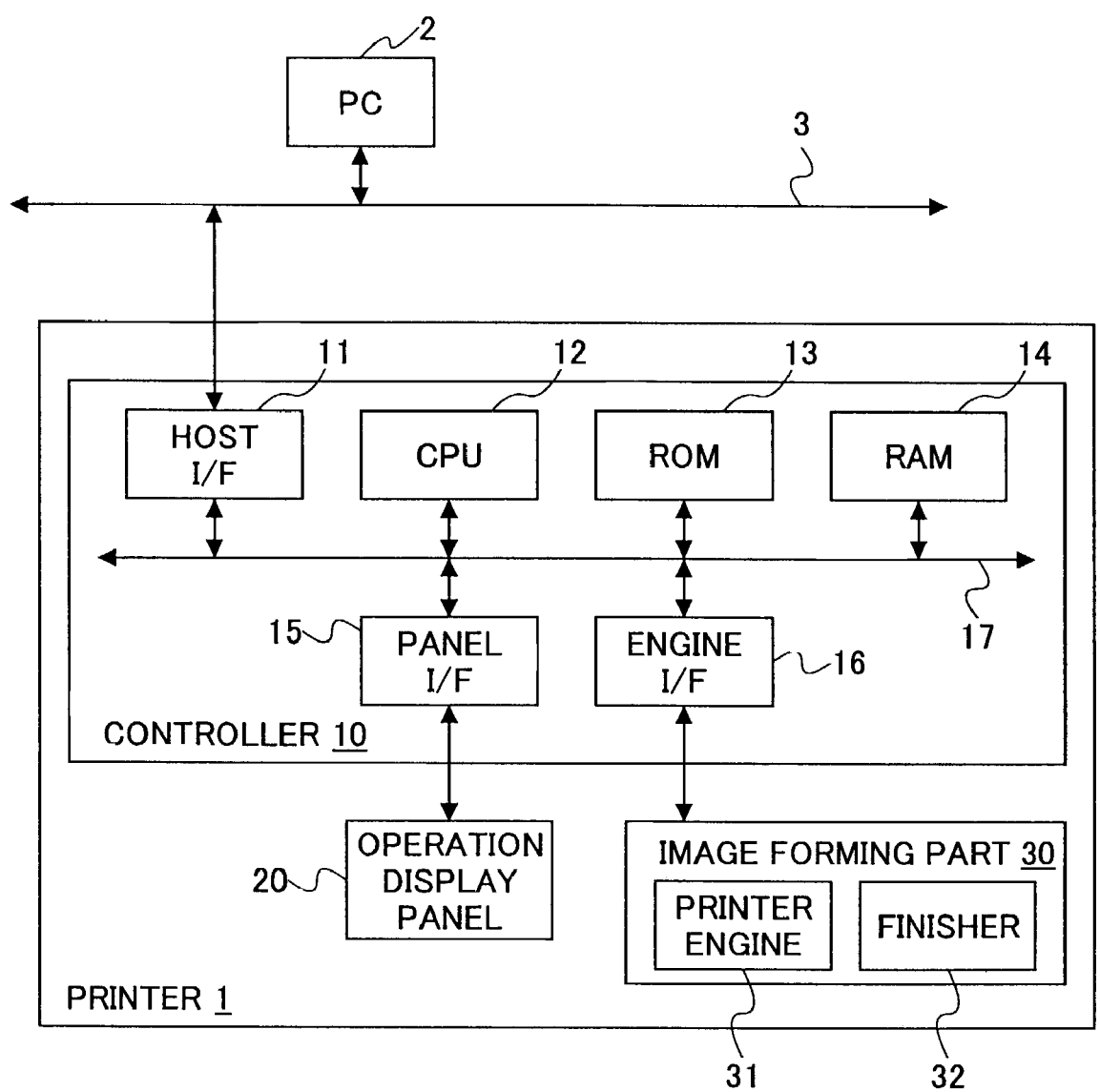
FIG. 1 is a block diagram of a printer system containing a printer according a first embodiment of the present invention.
Figure 2:
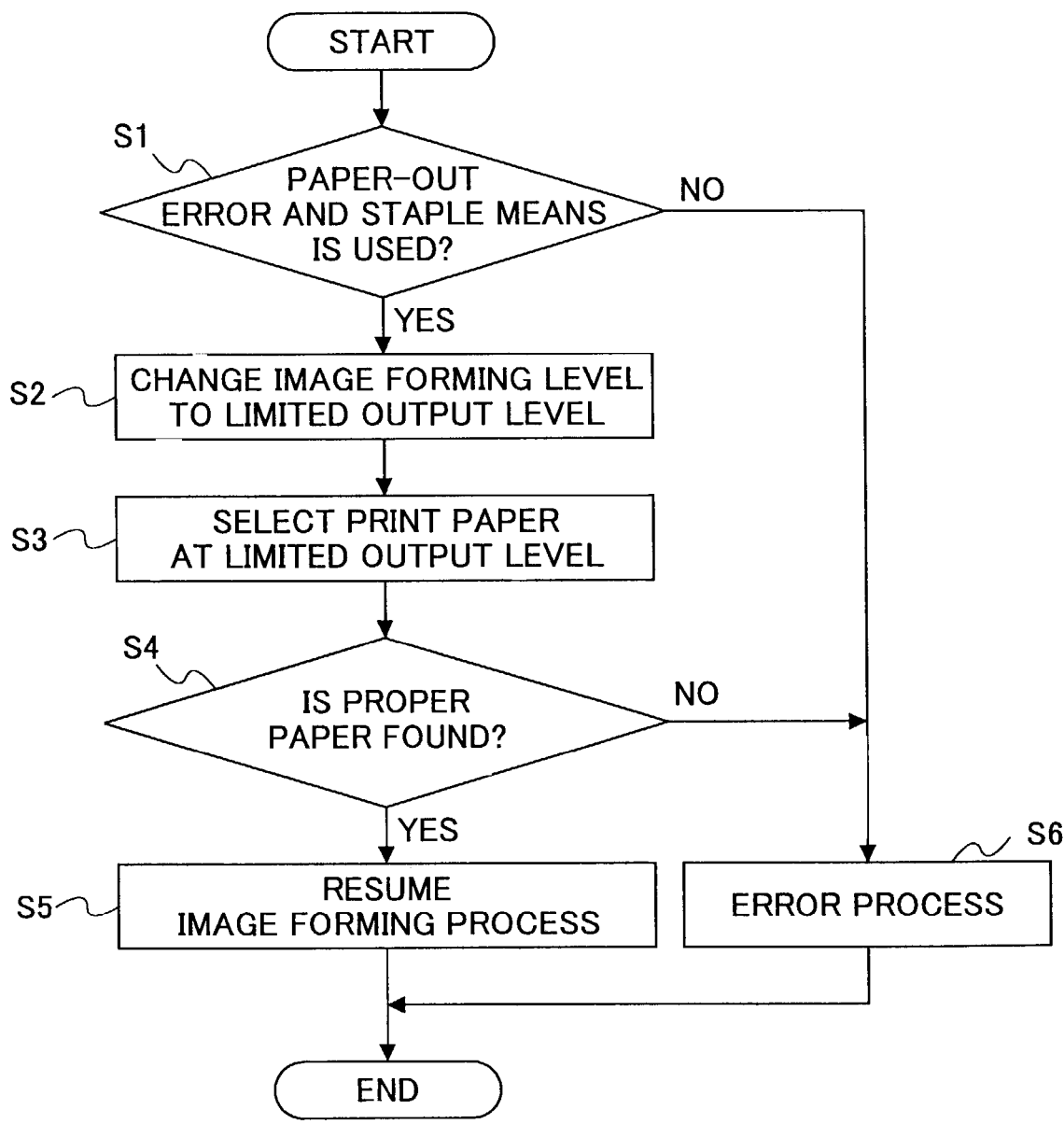
FIG. 2 is a flowchart of an operation of changing an image formation level in the printer shown in FIG. 1.

First, a description will be given of a printer, which is an image forming apparatus according to a first embodiment of the preset invention, and a print system constituted by the printer and a host apparatus. FIG. 1 is a block diagram of the print system comprising the printer 1 according to the first embodiment of the present invention. FIG. 2 is a flowchart of an image formation level changing process performed by the printer 1.

The print system shown in FIG. 1 is an image forming system, and is constituted by the printer 1, a personal computer (PC) 2 which is a host apparatus and a network 3 which connects the printer 1 to the personal computer 2. As for the network 3, although a local area network (LAN) and an intranet are mainly used, other networks such as the Internet may be used. Moreover, the network 3 can be a wired structure or a wireless structure. Alternatively, the printer 1 and the PC 2 may be directly connected without the network 3.

The PC 2 has a well-known hardware structure, and can be operated as a host apparatus of the printer 1 by installing a driver program and application programs for setting various setting operations to the printer 1 on a hard disc drive (HDD) provided in the PC 2 so as to have a CPU to execute the application programs. Thereby, the PC 2 can transmit image data and print data to the printer 1 so as to have the printer 1 to form an image based on the data. Moreover, the PC 2 can transmit setting data to the printer 1 so as to set to the printer 1 various print conditions such as an orientation and size of print papers, a number of outputs, post processing, etc. for each job, each user, each PC or each printer.

The printer 1 is provided with a controller 10, an operation display panel 20 and an image forming part 30. The controller 10 is a control part which controls the whole operation of the printer 1 and exchange of information with the PC 2. The controller 10 comprises a host interface (I/F) 11, a central processing unit (CPU) 12, a (read only memory) ROM 13, a (random access memory) RAM 14, a panel I/F 15 and an engine I/F 16, which are connected by a system bus 17. The host I/F 11 is an interface for connecting the printer 1 and the PC 2 through the network 3.

The CPU 12 performs a control of information exchange and operations of each part by performing various control programs and application programs stored in the ROM 13. The ROM 13 is a memory means to store various control programs, application programs and necessary parameters, etc. At least a part of the ROM 13 consists of rewritable non-volatility memory means such as an EEPROM so that setting information of the printer 1 is stored in this part. Moreover, if a portion which stores programs is made rewritable, an upgrade of a program etc. can be performed easily. The RAM 14 is a memory means to be used as a work memory of the CPU 12, or to be used as a memory, which stores image data or print data to form an image.

The panel I/F 15 is an interface for connecting the controller 10 and the operation display panel 20. The engine I/F 16 is an interface for connecting the controller 10 and the image forming part 30. The operation display panel 20 serves as both an operation part and a display part, and is constituted by a liquid crystal display (LCD), which includes various keys and a touch panel. The operation display panel 20 can receive an operation by a user, and can display various messages. A user can perform various settings to the printer 1 not only from the PC 2 but also from the operation display panel 20.

The image forming part 30 corresponding to image forming means provided with a printer engine 31 and a finisher 32. The image forming part 30 forms a visible image on a print sheet such as a print paper based on data sent through the engine I/F 16, and applies post-processing to the print paper according to a setup after the image formation. The printer engine 31 is a unit which takes charge of the image formation. An arbitrary method can be used for the image forming method carried out by the printer engine 31. In the present embodiment, an electronic photography is used as the image forming method. The finisher 32 is a unit which takes charge of post-processing. As the post-processing, there are, for example, a stapling process, a punching process, a sorting process, etc. The present invention is effective especially when the finisher 32 is provided with at least one of a stapling means and a punching means. Here, for the sake of simplification of explanation, the finisher 32 shall have only a staple processing means to perform the stapling process as a post-processing means.

When performing an image formation in the printer 1 of the above-mentioned structure, the image forming part 30 can perform an image formation according to a plurality of image formation levels including at least a complete output level and a limited output level. According to the complete output level, an image formation is carried out while all setup by a user is reflected. On the other, according to the limited output level, an image formation is performed while a part of the setup is changed or invalidated.

In the present embodiment, the limited output level is an image formation level which invalidates a setup of use of the staple processing means of the finisher 32. On the other hand, according to the complete output level, all setup is reflected, and, therefore, the staple processing means can be used naturally. It should be noted that the complete output level corresponds to a regular image formation level and other levels are image formation levels for emergency response to avoid possible errors.

When the finisher 32 has a punching means, use of this means is made invalidated (prohibited) or validated (permitted) as well. Moreover, an image formation level does not necessarily correspond to an image formation mode. For example, when use of the stapling means is not set from the start time, there is no change in not using the stapling means, even if an image formation is carried out at the complete output level or at the limited output level, and a result becomes the same.

The printer 1 usually performs an image forming operation at the complete output level. When an error occurs during an image forming operation at the complete output level and if the error can be avoided by change of the image formation level, the printer 1 changes the image formation level to the image formation level at which the error is avoidable so as to resume or continue the image forming operation. It should be noted that, in explanation of each embodiment, it is expressed as "avoidable" that there is a possibility to avoid an error, for the sake of convenience.

A description will now be given of a changing process of the image formation level. A paper-out error, a staple-needle-out error, a staple-sheets-number-excess error, etc. are considered to be an error avoidable by changing the picture formation level. Here, an explanation is given below of the paper out error as an example. A stapling means can usually strike a needle only at a leading end or a trailing end of a print paper. Accordingly, when a print paper is used in a longitudinal direction and if a setup is made to strike a needle at an upper side of the print paper, the print paper must be fed in the longitudinal direction. For this reason, when there is no print paper in the tray from which the print paper (print sheet) is fed in the longitudinal direction, or when there is no such a tray itself, a paper-out error may occur.

However, it is possible to form an image by using a print paper in a longitudinal direction even when the print paper is fed in a transverse direction. Then, even when there is no print paper in the tray to which the print paper is fed in the longitudinal direction when the stapling process is cancelled or there is no tray itself, the tray for feeding a print paper in a transverse direction is searched for. If print papers are present in the transverse direction feeding tray, an image formation can be carried out by feeding a print paper from the transverse direction feeding tray, and, thus, no paper-out error occurs, Therefore, it can be that the paper-out error is an error which can be avoided by canceling the stapling process, that is, the paper-out error is an error which is avoidable by changing the image formation level to the limited output level.

Thus, the CPU 12 of the printer 1 starts the process of the flowchart shown in FIG. 2 if an error occurs during an image forming operation at the complete output level. First, it is determined, in step S1, whether or not an error that has occurred is a paper-out error and use of a stapling process means is set up. The process of step S1 corresponds to an error discriminating procedure or step, and the CPU 12 serves as an error discriminating means. If the determination of step S1 is affirmative (YES), it is determined that the error is avoidable by changing the image forming level to the limited output level. At the limited output level, a setup of use of the stapling process means is invalid, the setup of use of the stapling process means is canceled by the change. The process of steps S1 and S2 correspond to a process of a level changing procedure or step, and the CPU 12 serves as a level changing means.

Then, in the next step S3, a paper selection is carried out again in a state of the limited output level where the setup of use of the stapling process means is cancelled. As mentioned above, since a print paper can be selected without limiting the paper feed direction in this state, the range of selection of a print paper is enlarged as compared with the case of the complete output level. It is determined, in step S4, whether there is any suitable paper. Since a paper-out error can be canceled if there is any print paper, the routine proceeds to step S5 so as to resume or continue image forming operation, and the process of the flowchart is ended. When it is determined, in step S4, that there is no print paper, it is determined that the error cannot be avoided even by changing the image formation level, and the routine proceeds to step S6. Moreover, if the determination of step S1 is negative (NO), the routine also proceeds to step S6.

In step S6, the image forming operation is interrupted as an error process, and an indication that the error has occurred is displayed on the operation display panel 20, and the process of the flowchart is ended. In this case, a subsequent operation is started after an instruction is made to cancel the job in which the error has occurred. It should be noted that although the description was given of the process for responding to the paper-out error for the sake of simplification, the image forming level is changed and a process for responding to the error may be performed if the error is not the paper-out error or the error is avoidable by changing the image formation level.

By performing the above-mentioned process, the job can be continued without cancellation when an error occurs during an image forming operation and if the error is avoidable by changing the image formation level. Therefore, even when an error occurs, a number of cancellations of a job can be reduced, a user's surveillance burden can be reduced, and the working efficiency of an image formation can be improved. The stapling process or the punching process with respect to print papers after formation of an image can be performed manually if it cannot be performed automatically. Thus, if the process serves as an obstacle to an image forming operation, the same image output as when the process is performed automatically can be obtained if the stapling and/or punching is performed manually by a user even if the process is cancelled, and, thus, there is no large problem occurs. Therefore, in the present invention, it is very effective if a setup of a function which can be processed by a user is changed or invalidated at the limited output level.

It should be noted that although only two image formation levels, the complete output level and the limited output level, are explained in the above-mentioned embodiment, other image formation levels may be provided. A second embodiment described below is an example of such a case. Additionally, a setup which is changed or invalidated by the limited output level is not limited to the setup of the stapling process means. If the finisher has a punching means or a sorting means, a setup for these means may also be changed or invalidated. In such as case, the criteria of the determination in step S1 of FIG. 2 may be prepared in response to the change or invalidation. Moreover, a setup of a part other than the finisher may be changed or invalidated.

Figure 3:
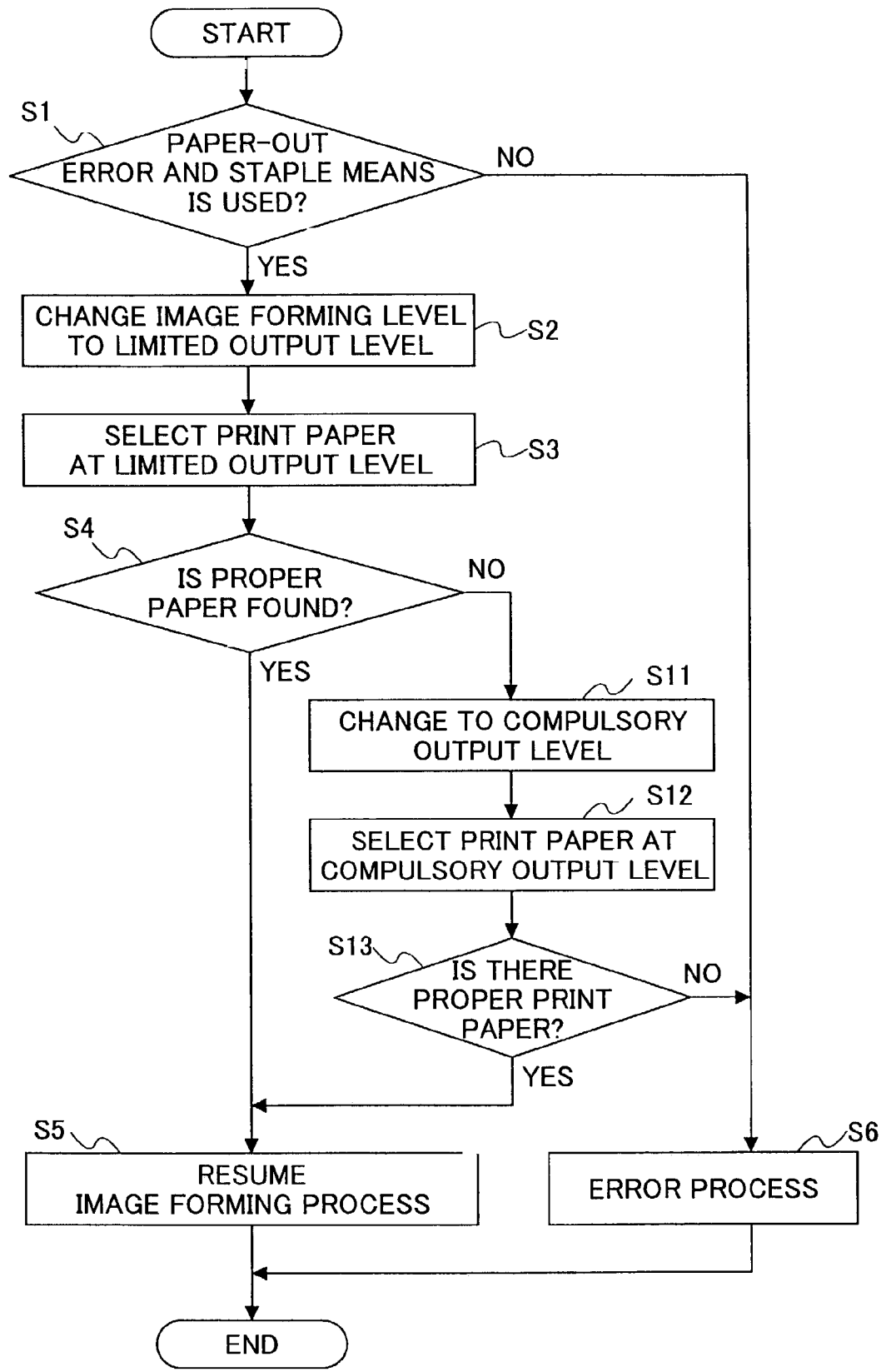
FIG. 3 is a flowchart of an operation of changing an image formation level in a printer according to a second embodiment of the present invention.

A description will be given of a printer which is an image forming apparatus according to a second embodiment of the present invention and a print system constituted by the printer and a host apparatus. FIG. 3 is a flowchart of an operation for changing an image formation level in the printer. In the present embodiment, an image formation can be performed at a compulsory output level in addition to the complete output level and the limited output level that are explained in the above-mentioned first embodiment. According to the compulsory output level, an image formation is given a priority and only a minimum setup is validated. In the present embodiment, an image formation level can be changed between the three levels that are the complete output level, the limited output level and the compulsory output level. The hardware and other structures of the printer according to the present embodiment are the same as the printer according to the first embodiment except for the above-mentioned point, and descriptions thereof will be omitted. It should be noted that, in the present embodiment, the compulsory output level is an image formation level which does not only invalidate use of the stapling process means but also invalidate a setup of a print paper size. According to the limited output level, a paper-our error occurs if there is no print paper of the designated size since a setup of the size of a print paper is effective. However, if a setup of a print paper size is also invalidated and any kind of printer paper can be fed, a certain image can be output regardless of whether an image protrudes from the print paper or a large margin is formed in the print paper, and, thus, the paper-out error rarely occurs.

A description will be given of an operation to change the image formation level in the present embodiment with reference to an operation related to a paper-out error as an example similar to the first embodiment. When an error occurs during an image forming operation at the complete output level, the CPU 12 of the printer 1 starts an operation shown by a flowchart of FIG. 3. The process of steps S1 through S4 is the same as the process of the first embodiment explained with reference to FIG. 2, and descriptions thereof will be omitted. The process of step S5 when there is a proper print paper is also the same as the first embodiment. However, the process of step S2 corresponds to a first level changing procedure or step, and the CPU 12 serves as a first level changing means in the present embodiment.

When it is determined, in step S4, that there is no proper print paper, the paper-out error occurs again. However, since the choice of a print paper is broadened if the image formation level is changed to the compulsory output level as mentioned above, the paper-out error does not occur. Therefore, the paper-out error is an error avoidable by changing the image formation level. Then, the CPU 12 makes such a judgment and the routine process to step S11. It should be noted that the judgment corresponds to the process of an error discriminating means step, and the CPU 12 serves as error discriminating means in the present embodiment. In step S11, the image formation level is changed to the compulsory output level. Since the setup of the size of a print paper is invalid at the compulsory output level, the setup of the size of a print paper is canceled due to the level change. The process of step S11 corresponds to a second level changing procedure or step, and the CPU 12 serves as a second level change means in the present embodiment.

Then, a selection of a print paper is performed, in the next step S12, in a state of the compulsory output level at which a setup of the size of a print paper is canceled. In this state, since a paper can be chosen without limiting the size of a print paper, the choice of a print paper is broadened as compared with the case of the limited output level. In step S13, it is determined whether there is any suitable print paper. Since the paper-out error can be canceled if there is a suitable print paper, a routine proceeds to step S5 so as to continue the image forming operation, and, then, the process of the flowchart is ended. When is it determined, in step S13, that there is no suitable print paper, it is determined that the error cannot be avoided even by changing the image formation level, and the routine proceeds to step S6. In step S6, an error process is performed and, then, the process of the flowchart is ended. The process of step S6 is also the same as that explained with reference to FIG. 2 in the first embodiment, and descriptions thereof will be omitted.

It should be noted that although the process of changing the image formation level only when a paper-out error occurs for the sake of simplification of the explanation, when the error is not the paper-out error and if the error is avoidable by changing the image formation level, the image formation level may be changed and a process responding to the error may be performed. Moreover, although the determination as to whether an error occurring during an image forming operation at the limited output level is avoidable by changing the image formation level is combined with the process of step S4, when it is possible that an error unavoidable with change of the image formation level occurs after being changed to the limited output level, judgment as to whether the error is avoidable or not is prepared independently so that the error process is performed immediately if the error is avoidable.

Since attempts can be made to avoid an error by performing the above-mentioned process while sequentially changing the image formation level, a further detailed response can be carried out than the first embodiment. Moreover, since the compulsory output level is provided, a response can be made to a request to give a priority of an output even if the output result is different from the desired output form, and a number of cancellations of a job can be reduced further than the first embodiment. It should be noted that although the compulsory output level is set as the image formation level at which the minimum setup is validated, a number of print papers may be reduced by performing an intensive image formation of a double-side image formation as a concept of giving a priority to an image forming operation. Thus, the compulsory output level may be set as an image formation level which causes such an operation. Moreover, although the level change can be made between the three kinds of image formation levels in the above description, a greater number of image formation levels may be provided so that the level change can be made between the more number of image formation levels.

Figure 4:
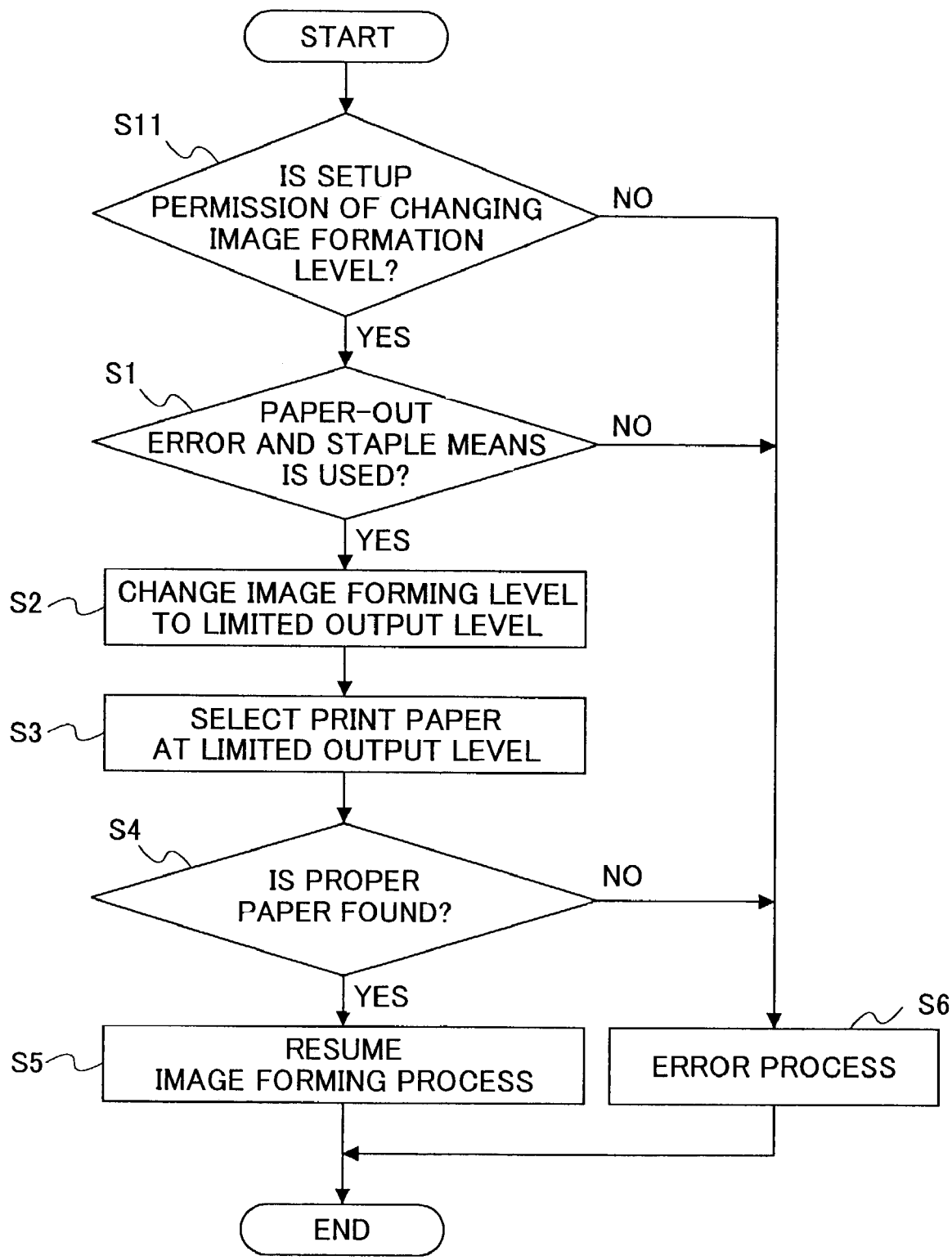
FIG. 4 is a flowchart of an operation of changing an image formation level in a printer according to a third embodiment of the present invention.

A description will now be given of a printer which is an image forming apparatus according to a third embodiment of the present invention and a print system constituted by the printer and a host apparatus. FIG. 4 is a flowchart of an operation to change an image formation level in the printer. FIGS. 5 through 7 are illustrations showing setting items set in an image formation level changing operation performed by the printer.

As explained in the first embodiment, if an image formation level is changed when an error occurs, an image formation can be performed but the output result may be different from an original request such as a stapling process is not applied. By changing an image formation level, an effect which was already explained can be obtained, however, it may be preferable to cancel an output if a desired output cannot be obtained. For example, there may be a case in which a user feels inconvenience to carry out a stapling operation manually. Then, in order to respond to such a case, a setup can be made whether to change the image formation level in the present embodiment. Structures including a hardware structure are the same as that of the first embodiment, and descriptions of other points will be omitted.

In the present embodiment, the CPU 12 of the printer 1 starts an operation shown in a flowchart of FIG. 4 when an error occurs during an image forming operation at the complete output level. First, it is determined, in step S11, whether to permit a change in the image forming operation by referring to information regarding predetermined setting values and conditions of image formation. If it is determined that the setup is to permit a change, that is, if the setup is to effect an operation of the level change permission setting means, the routine proceeds to step S1 so as to resume the operation. If the set up is not to permit a change, that is, if the setup is to effect an operation of the level change permission setting means, the routine proceeds to step S6 so as to perform an error process without performing an operation to change the image formation level. The process of steps S1 through S6 is the same as the process explained with reference to FIG. 2 in the first embodiment, and descriptions thereof will be omitted. The process of step S11 corresponds to a level change permission setting procedure or step, and the CPU 12 serves as level change permission setting means in the present embodiment. And by performing such a process, in addition to the effect explained in the first embodiment, a user can prohibit a change of an image formation level, if needed so as to obtain an effect that the convenience of apparatus can be improved.

Here, as shown in FIG. 5, the setting value referred to in the process of step S1 can be the same setting value irrespective of users, jobs and image formation conditions. Otherwise, the setting value may by set for each user as shown in FIG. 6. When forming an image according to an instruction from a host computer, there are many cases in which data sent from the host computer contains data that indicates the user who made the instruction. For this reason, it can be determined whether to permit an operation of changing the image formation level by comparing the data indicting the user with a setting value store in the printer 1. There may be a difference among individuals as to how much he or she feels inconvenience to perform a stapling operation or a punching operation when it cannot be performed automatically by the printer. Moreover, it is also considered that purpose of use of the printer may change depending on each user. For the above-mentioned reasons, an operation more matching the needs of a user can be performed by enabling setting on an individual user basis.

Additionally, as shown in FIG. 7, the change of the image formation level may be enabled or permitted when a number of prints is less than a threshold number that was previously set, and the change may be disabled or prohibited when a number of prints is greater than the threshold number. When there are many prints, a required labor increases if a stapling operation or a punching operation is performed later. However, according to the above-mentioned setting, the change of the image formation level is prohibited, when a number of prints is great, so as to prevent an increase in inconvenience due to the change of the image formation level. Such a setting value can be determined by an operation through the operation display panel 20, and also determined according to information of a setting instruction sent from the PC 2. When the setting instruction is made by the PC 2, the user is not required to move to the front of the printer 1 so as to perform the setting, which reduces a labor required for the operation.

Moreover, a setup of permission of the change of the image formation level may be received by the PC 2 for each image formation job, the setting information may be sent to the printer 1 together with an image formation instruction, and the determination of step S11 may be made based on the setting information. In this way, a more detailed response can be made since the setting can be made on an individual job basis. Moreover, when the change of the image formation level is made between the complete output level, the limited output level and the compulsory output level as is in the second embodiment, the permission of the change of the image formation level may be set as is in the present embodiment. In this case, it is preferable to make a permission of change to be set individually with respect to the change from the complete output level to the limited output level and the change from the limited output level to the compulsory output level.

Figure 8:
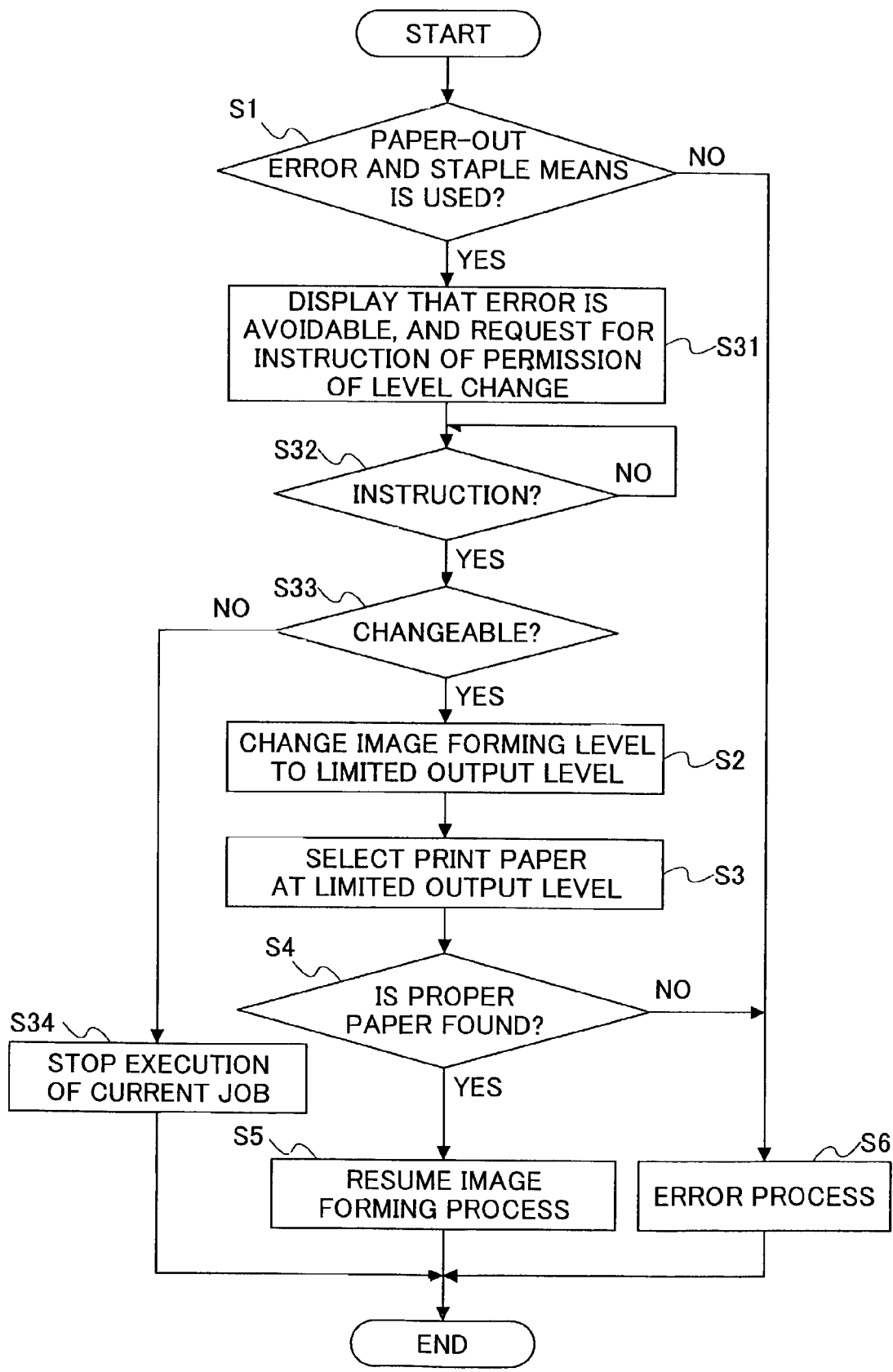
FIG. 8 is 1 a flowchart of an operation of changing an image formation level in a printer according to a fourth embodiment of the present invention.

A description will now be given of a printer which is an image forming apparatus according to a fourth embodiment of the present invention and a print system constituted by the printer and a host apparatus. FIG. 8 is a flowchart of an operation to change an image formation level in the printer. FIG. 9 is an illustration of a display of messages in the process shown in FIG. 8.

In the present embodiment, when an error that is avoidable by a change in the image formation level occurs in the printer, such a fact is displayed and a permission of the change of the image formation level is requested to the user. Structures of the printer including a hardware structure are the same as that of the first embodiment, and descriptions of other points will be omitted.

A description will be given of an operation to change the image formation level in the present embodiment with reference to an operation related to a paper-out error as an example similar to the first embodiment. In the present embodiment, the CPU 12 of the printer 1 starts an operation shown in a flowchart of FIG. 8 when an error occurs during an image forming operation at the complete output level.

First, it is determined, in step S1, whether or not the error is a paper-out error and whether or not use of the stapling process means is set similar to the first embodiment. If the determination is affirmative (YES), the routine proceeds to step S32. In step S31, the fact that the error is avoidable by changing the image formation level is displayed on the operation display panel 20 and request an instruction for permission of the change. As for the display, illustrated in FIG. 9 may be used.

In this case, since the setup for the stapling process is cancelled if the image formation level is changed, the instruction is requested in the form of permission of the stapling process. Moreover, as a choice when not permitting the change, "job reset" is provided to cancel the execution of the job itself. The process of step S31 corresponds to a change permission reception procedure or step, and the CPU 12 serves as change permission reception means in the present embodiment.

In the following step S32, an input of any instruction is waited for. It should be noted that, if the error is canceled by replenish of print papers or the like before any selection is made, an interruption is made to end the operation of the flowchart so as to resume the image forming operation. If it is determined, in step S32, that there is made an instruction, the routine proceeds to step S33 where it is determined whether or not the instruction is to cancel the stapling process, that is, whether or not the instruction is to permit the change of the image formation level. If the change is permitted, the routine proceeds to step S2 so as to perform the subsequent process. The subsequent process is the same as that explained in the first embodiment, and descriptions thereof will be omitted. In this embodiment, the process of step S32 through S2 of FIG. 8 corresponds to a change execution procedure or step, and the CPU 12 serves as change execution means.

If it is determined, in step S33, that the change is not permitted, it is determined that the instruction is a job reset instruction, and the routine proceeds to step S34. In step S34, the currently executed job is stopped, and the operation of the flowchart shown in FIG. 8 is ended. And if there is a subsequent job, an image forming process of the subsequent job is started. If the determination of step S1 is negative (NO), the routine proceeds to step S6 so as to perform an error process, similar to the first embodiment. According to the above-mentioned process, a response to an error can be requested to a user. Thus, there is an effect, in addition to the effect of the first embodiment, that a response that matches the user's preference can be made.

It should be noted that a choice of canceling only the stapling process and not canceling the job may be prepared as one of choices received by the process of step S31 so that the routine proceeds to step S6 when such a choice is taken. Moreover, data required in the process of step S31 may be transmitted to the PC 2, and the display of messages or the reception of instructions may be performed by a display means or an operation means on the side of the PC 2. Moreover, similar to the second embodiment, when changing the image formation level between the complete output level, the limited output level and the compulsory output level, an instruction to permit the change may be requested before the change is carried out. In this case, the instruction may be requested individually with respect to the change from the complete level to the limited output level and the change form the limited output level to the compulsory output level, or may be requested at the same time. Moreover, similar to the third embodiment, if the setup is to permit the change of the image formation level, the process subsequent to step S1 may be performed.

Figure 10:
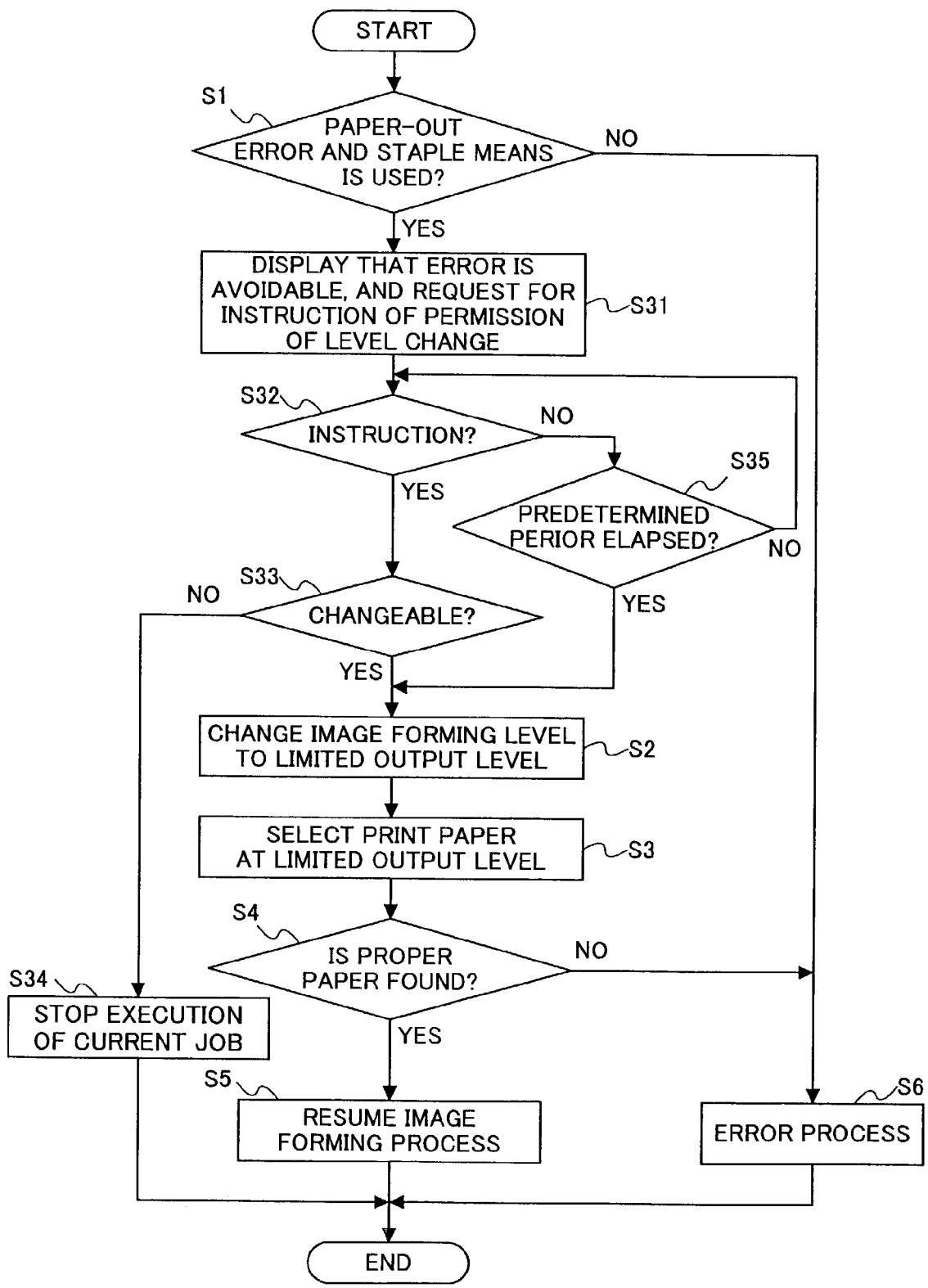
FIG. 10 is a flowchart of an operation of changing an image formation level in a variation of the printer according to the fourth embodiment of the present invention.

A description will now be given of a variation of the above-mentioned fourth embodiment of the present invention. FIG. 10 is a flowchart of an image formation level changing operation performed by a printer which is the variation of the present invention. In this variation, the CPU 12 of the printer 1 starts an operation shown in FIG. 10 when an error occurs during an image forming operation at the complete output level. The operation shown in FIG. 10 differs from the process shown in FIG. 8 in the process of step S35, and description will be give to the different point.

In the process shown in FIG. 10, if there is no instruction in step S32, the routine proceeds to step S35 so as to determine whether or not a predetermined period has elapsed. Then, it is determined that the predetermined period has not elapsed, the routine returned to step S32 so as to determine whether or not an instruction is made. If the predetermined period has been elapsed, that is, when no instruction has been made since the start of reception of instructions, the routine proceeds to step S32 so as to change the image formation level. According to the above-mentioned process, the operation can be automatically progressed even when the user is not aware of the message displayed in the process of step S32 or the user does not have an opportunity to make an instruction. Thus, the process can be prevented from being interpreted for a long time, which results in an improvement of the working efficiency.

It should be noted that although the printer was mentioned as an example of an image forming apparatus, in each of the embodiments mentioned above, the present invention is not limited to the embodiments, and is applicable to an image forming apparatus such as a copy machine, a facsimile apparatus or a digital compound machine. Additionally, the present invention is not limited to an image forming apparatus connected to a host computer, and is applicable to a stand-alone type image forming apparatus. When applying the third embodiment to an image forming apparatus such as a copy machine to which is caused to perform an image formation by being directly operated, an exclusive key button may be provided on the operation display panel 20 so that validation/invalidation of the image formation level changing operation can be set. Thus, every time when an image formation is instructed, a setup corresponding to the instruction can be performed, which results in improvement of an operation of the image forming apparatus.

The present invention is not limited to the specifically disclosed embodiments, and variations and modifications may be made without departing from the scope of the present invention.

The present application is based on Japanese priority application No. 2002-152683 filed May 27, 2002, the entire contents of which are hereby incorporated by reference.

What is claimed is:

1. An image forming apparatus which is capable of performing an image forming operation and an optional operation selected by a user and not involving formation of an image, in accordance with setting items set by the user, the image forming apparatus comprising:

image forming means for forming an image on a print sheet based on given data according to a plurality of image formation levels including at least a complete output level and a limited output level, all setting items set by a user being reflected at the complete output level and a part of the setting items set by the user being changed or invalidated at the limited output level;

error discriminating means for discriminating an error relating to the optional operation, said error being of a type that can be avoided by changing one of the image formation levels which is currently set in the image forming apparatus to a different one of the image formation levels; and level changing means for changing, when an error occurs during an image forming operation preformed at the complete output level and said error discriminating means discriminates that the error can be avoided by changing the image formation level, the complete output level to said different one of the image formation levels at which the error can be avoided; and level change permission setting means for setting permission or prohibition of said change of the complete output level to said different one of the image formation levels by said level changing means when said error relating to the optional operation occurs, wherein if said change of the complete output level to said different one of the image formation levels by said level changing means is set to be prohibited, said change is not performed by said level changing means.

2. The image forming apparatus as claimed in claim 1, wherein said image forming levels includes the complete output level, the limited output level and a compulsory output level at which a formation of an image is given a priority and minimum setting items are validated; and said level changing means includes first level changing means and second level changing means, the first level changing means for changing, when an error occurs during an image forming operation performed at the complete output level and said error discriminating means discriminates that the error is avoidable by changing the image formation level, the complete output level currently set in said image forming apparatus to the limited output level, the second level changing means for changing, when an error occurs during an image forming operation performed at the limited output level and said error discriminating means discriminates that the complete output level and the error is discriminated as avoidable by changing the said image forming apparatus to the compulsory output level.

3. The image forming apparatus as claimed in claim 1, further comprising a finisher which performs the optional operation including at least one of a stapling operation performed by stapling process means and a punching operation performed by punching process means, wherein use of said stapling process means and/or said punching operation means of said finisher is permitted at the complete output level and use of said stapling process means and/or said punching operation means of said finisher is prohibited at the limited output level.

4. The image forming apparatus as claimed in claim 1, further comprising a display part which displays information to the user, wherein said level changing means includes change permission reception means and change execution means, wherein said change permission reception means causes said display part to display information indicating that the error is avoidable by changing the image formation level so as to receive an instruction of permission of the change to the image formation level at which the error is avoidable, and said change execution means changes to image formation level at which the error is avoidable when the instruction of permission is received by said change permission reception means.

5. The image forming apparatus as claimed in claim 4, wherein:

said change permission reception means causes said display part to display information indicating that the error is avoidable by changing the image formation level to the limited output level according to a result of discrimination by said error discrimination means so as to receive the instruction of permission of the change to the limited output level;

said change execution means changes the image formation level to the limited output level when said change permission reception means receives the instruction of permission; and said level changing means includes means for changing the image formation level to the limited output level even when said change permission reception means does not receive any instruction from a start of reception for a predetermined time period.

6. The image forming apparatus as claimed in claim 5, further comprising a finisher which performs the optional operation including at least one of a stapling operation performed by stapling process means and a punching operation performed by punching process means, wherein use of said stapling process means and/or said punching operation means of said finisher is permitted at the complete output level and use of said stapling process means and/or said punching operation means of said finisher is prohibited at the limited output level.

7. The image forming apparatus as claimed in claim 1, further comprising an operation part through which the user operate said image forming apparatus, wherein said level change permission setting means sets the permission or prohibition in accordance with an instruction supplied through said operation part.

8. The image forming apparatus as claimed in claim 1, wherein said level change permission setting means sets the permission or prohibition on a basis of an individual image forming job.

9. The image forming apparatus as claimed in claim 1, wherein said level change permission setting means sets the permission or prohibition on a basis of an individual user.

10. The image forming apparatus as claimed in claim 1, wherein said level change permission setting means sets the prohibition when a number of print sheets to be output is equal to or greater than a predetermined number.

11. An image forming system comprising an image forming apparatus and a host apparatus connected to said image forming apparatus via a network,
wherein said image forming apparatus is capable of performing an image forming operation and an optional operation not involving image formation and selectable by a user, in accordance with setting items set by the user, and comprises:
image forming means for forming an image on a print sheet based on given data according to a plurality of image formation levels including at least a complete output level and a limited output level, all setting items set by a user being reflected at the complete output level and a part of the setting items set by the user being changed or invalidated at the limited output level;
error discriminating means for discriminating an error relating to the optional operation, said error being of a type that can be avoided by changing one of the image formation levels which is currently set in the image forming apparatus to a different one of the image formation levels;
level changing means for changing, when an error occurs during an image forming operation performed at the complete output level and said error discriminating means discriminates that the error can be avoided by changing the image formation level, the complete output level to said different one of the image formation levels at which the error can be avoided; and
level change permission setting means for setting permission or prohibition of an operation of said level changing means,
wherein said image forming means forms an image based on data transmitted from said host apparatus, and said host apparatus includes means for sending to said image forming apparatus information regarding an instruction of setting permission or prohibition to be made by said level change permission setting means.

12. An image forming method performed by an image forming apparatus which is capable of performing an image forming operation and an optional operation not involving image formation and selectable by a user, in accordance with setting items set by the user, the image forming apparatus forming an image on a print sheet based on given data according to a plurality of image formation levels including at least a complete output level and a limited output level, all setting items set by a user being reflected at the complete output level and a part of the setting items set by the user being changed or invalidated at the limited output level,
the image forming method comprising the steps of;
discriminating an error relating to the optional operation, said error being of a type that can be avoided by changing one of the image formation levels which is currently set in the image forming apparatus to a different one of the image formation levels; and
changing, when an error occurs during an image forming operation performed at the complete output level and said error discriminating step discriminates that the error can be avoided by changing the image formation level, the complete output level to said different one of the image formation levels at which the error can be avoided; and
setting permission or prohibition of an operation of said level changing step.

13. The image forming method as claimed in claim 12, wherein said image forming levels includes the complete output level, the limited output level and a compulsory output level at which a formation of an image is given a priority and minimum setting items are validated; and
said level changing step includes a first level changing step and a second level changing step, the first level changing step for changing, when an error occurs during an image forming operation performed at the complete output level and said error discriminating step discriminates that the error is avoidable by changing the image formation level, the complete output level currently set in said image forming apparatus to the limited output level, the second level changing step for changing, when an error occurs during an image forming operation performed at the limited output level and said error discriminating step discriminates that the error is avoidable by changing the image formation level, the limited output level currently set in said image forming apparatus to the compulsory output level.

14. The image forming method as claimed in claim 12, wherein said image forming apparatus further comprising a finisher which performs the optional operation including at least one of a stapling operation performed by stapling process means and a punching operation performed by punching process means, wherein use of said stapling process means and/or said punching operation means of said finisher is permitted at the complete output level and use of said stapling process means and/or said punching operation means of said finisher is prohibited at the limited output level.

15. The image forming method as claimed in claim 12, wherein said level changing step includes a change permission reception step and a change execution step, wherein said change permission reception step causes a display part provided in said image forming apparatus to display information indicating that the error is avoidable by changing the image formation level so as to receive an instruction of permission of the change to the image formation level at which the error is avoidable, and said change execution step changes the current image formation level to a level at which the error is avoidable when the instruction of permission is received in said change permission reception step.

16. The image forming method as claimed in claim 15, wherein:
said change permission reception step causes said display part to display information indicating that the error is avoidable by changing the image formation level to the limited output level according to a result of discrimination by said error discrimination step so as to receive the instruction of permission of the change to the limited output level;
said change execution step changes the image formation level to the limited output level upon receipt of the instruction of permission in said change permission reception step; and
said level changing step includes a step of changing the image formation level to the limited output level even when no instruction is received in said change permission reception step from a start of reception for a predetermined time period.

17. The image forming method as claimed in claim 12, wherein said level change permission setting step sets the permission or prohibition in accordance with an instruction supplied through an operation part of said image forming apparatus.

18. The image forming method as claimed in claim 12, wherein said level change permission setting step sets the permission or prohibition on an individual image forming job basis.

19. The image forming method as claimed in claim 12, wherein said level change permission setting step sets the permission or prohibition on an individual user basis.

20. The image forming method as claimed in claim 12, wherein said level change permission setting step sets the prohibition when a number of print sheets to be output is equal to or greater than a predetermined number.

* * * * *